United States Patent
Andreasson

(10) Patent No.: US 7,093,510 B2
(45) Date of Patent: Aug. 22, 2006

(54) SELF-CENTERING DEVICE FOR LINEAR DRIVE UNITS

(75) Inventor: Sune Andreasson, Kristianstad (SE)

(73) Assignee: Tollo Linear AB, Kristianstad (SE)

( * ) Notice: Subject to any disclaimer, the term of this patent is extended or adjusted under 35 U.S.C. 154(b) by 568 days.

(21) Appl. No.: 10/399,944

(22) PCT Filed: Oct. 23, 2001

(86) PCT No.: PCT/SE01/02316

§ 371 (c)(1),
(2), (4) Date: Aug. 27, 2003

(87) PCT Pub. No.: WO02/35119

PCT Pub. Date: May 2, 2002

(65) Prior Publication Data

US 2004/0050192 A1 Mar. 18, 2004

(30) Foreign Application Priority Data

Oct. 26, 2000 (SE) .................................... 0003884

(51) Int. Cl.
*F16H 1/26* (2006.01)
*F16H 27/02* (2006.01)
*F16H 29/02* (2006.01)
(52) U.S. Cl. .................. 74/89.36; 74/89.23; 74/424.71
(58) Field of Classification Search ............... 74/89.23, 74/89.32, 89.33, 89.36, 89.37, 424.71; 384/42, 384/38
See application file for complete search history.

(56) References Cited

U.S. PATENT DOCUMENTS 3,874,245 A * 4/1975 Kral et al. ................. 74/89.33
4,530,251 A * 7/1985 Henle ........................ 74/89.36
4,565,104 A * 1/1986 Akin ......................... 74/89.23
4,715,730 A   12/1987 Magnuson (Continued)

FOREIGN PATENT DOCUMENTS

SE         512637        4/2000

(Continued)

*Primary Examiner*—Richard Ridley
*Assistant Examiner*—Colby Hansen
(74) *Attorney, Agent, or Firm*—Harness, Dickey & Pierce, P.L.C.

(57) ABSTRACT

A linear unit (1) comprising a profiled rail (2) along which a carriage (3) is arranged for sliding motion backwards and forwards by means of a reversible screw (4) which actuates the carriage and on either side of the carriage passes through a bore (7) in a screw support (8). A pull rod (24) displaces the screw support backwards and forwards along the profiled rail between to end stop positions, and the screw support serves as a support bearing carrying the screw between bearings (10) supporting the screw at its ends. A self-centering device for automatic centering of the screw in the screw support is formed with a self-centering element (11) mounted in the screw-support bore, said element slidingly abutting against the screw both when the screw is rotating in either one of its directions of rotation and when the screw support assumes its end stop positions. The pull rod kinetically interconnects the screw supports located on either side of the carriage, whereby as the carriage is displaced in a sliding motion in one direction it will abut against the screw support located on one side of the carriage for displacement of said screw support from one of its end stop positions to the other one while simultaneously, via the pull rod, bringing along in its movement the screw support located on the other side of the carriage, and reversely.

17 Claims, 4 Drawing Sheets

U.S. PATENT DOCUMENTS 4,878,390 A     11/1989   Hauser
6,327,924 B1 *   12/2001   Nagai et al. ............... 74/89.36
6,655,225 B1 *   12/2003   Nagai et al. ............... 74/89.33
6,880,417 B1 *   4/2005   Nagai et al. ............... 74/89.36

FOREIGN PATENT DOCUMENTS

WO     9902892     1/1999

* cited by examiner

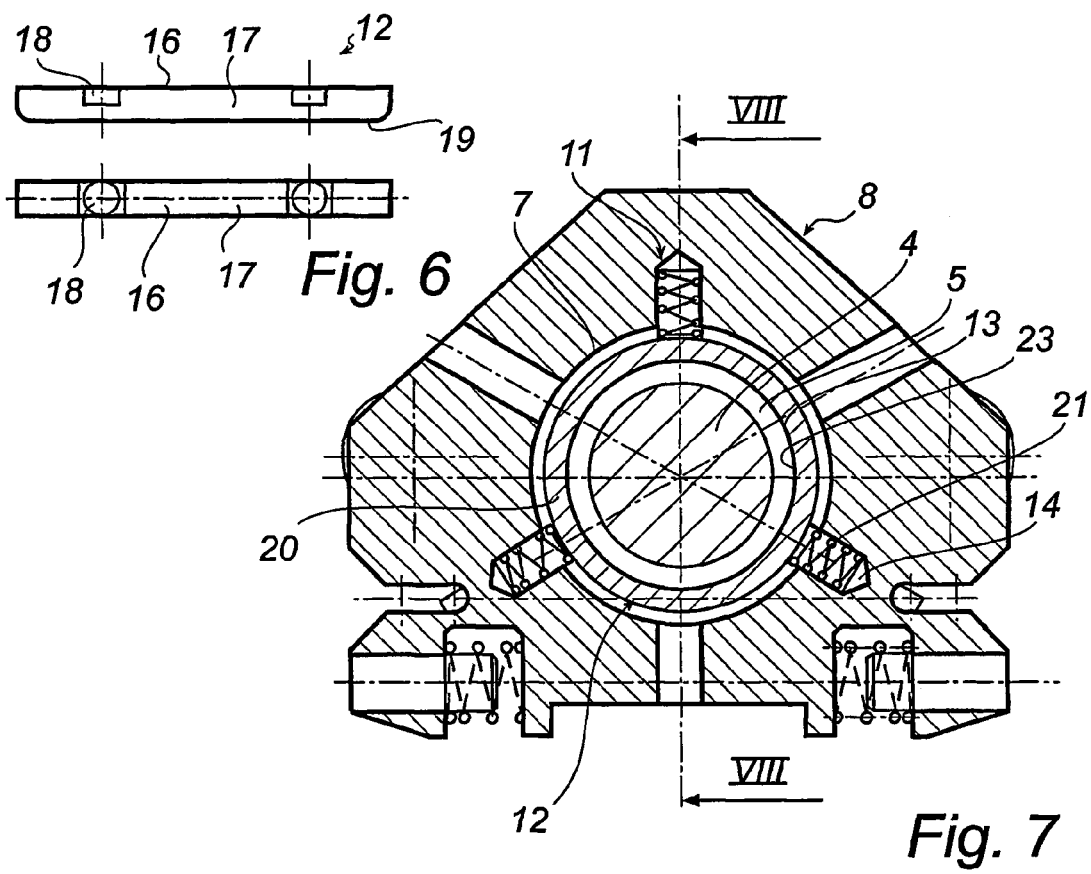
Fig. 6
Fig. 7
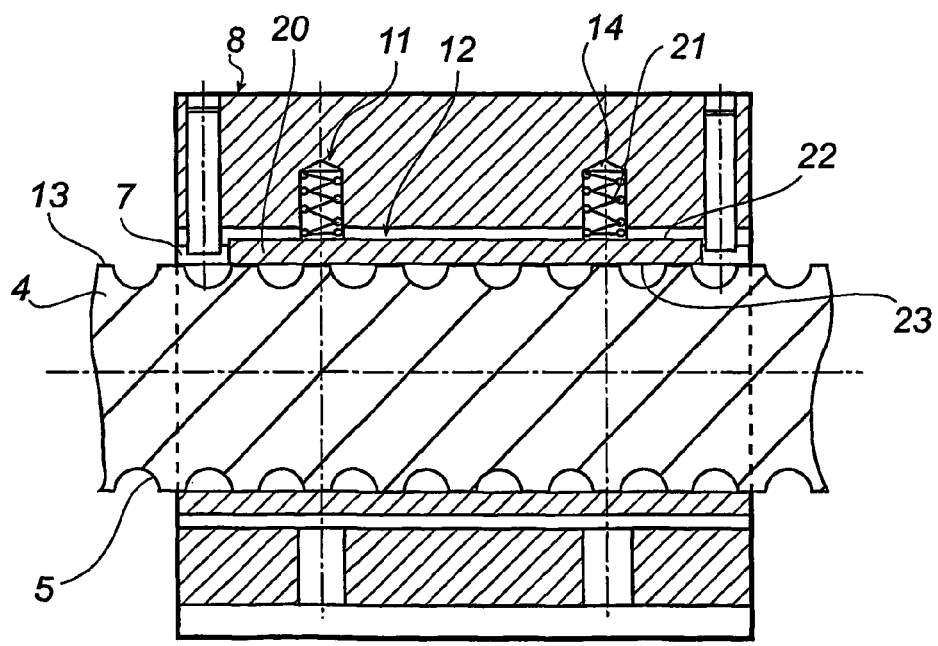
Fig. 8

SELF-CENTERING DEVICE FOR LINEAR DRIVE UNITS

TECHNICAL FIELD OF INVENTION

The present invention relates to a device for linear drive units of the type comprising a profiled rail along which a carriage is arranged for sliding movement backwards and forwards in response to actuation from a threaded screw, said screw arranged to rotate in two opposite directions and being drivingly connected with the carriage and, on either side of the carriage, passing freely through a through-bore in at least one screw support, said support being arranged to be displaced by means of a driver means for movement backwards and forwards along the profiled rail between two end stop positions and forming bearing means carrying said screw intermediate end bearings that support the screw at the ends of the latter.

BACKGROUND OF THE INVENTION

Screw supports of this kind primarily serve to counteract tendencies of the screw, which usually is a ball screw, to start vibrating and bending or being deflected outwards, when the screw reaches a critical rotational speed. Such lateral deflections depend among other things on the length of the screw and its rotational speed. When the screw is long and/or rotates at a high speed, this critical rotational-speed value is reached at an earlier stage than when the screw is shorter and/or rotates at a lower speed.

In the case of long linear units having a length of several meters, up to six meters, and being fitted with a long screw of a corresponding length, such tendencies to deflection outwards of the screw may be counteracted with the aid of two or more such screw supports. To allow the carriage to be slid from one end of the linear unit to the opposite one, various driver means have been suggested to displace the screw supports from a first end stop position along the longitudinal extension of the screw to another end stop position and then, in a return displacement movement, return the screw supports to their first end stop position.

A prior-art driver means configured as interacting locking means between carriage and screw supports suffers from the disadvantage of being unnecessarily complicated and in addition exposed to excess wear from the displacement of the screw supports backwards and forwards between the end stop positions by means of the carriage, a feature which often leads to unsatisfactory operational reliability and stability of the linear unit.

Often, such interacting locking means also require so much space in the area around the linear unit that there is a risk that, while moving, the screw supports hook onto some component of the linear unit, which likewise impairs the operational reliability and stability of the linear unit and may lead to breakdowns. In addition, interacting locking means between carriage and screw supports of a kind that are constantly interconnected and disconnected mechanically generate a strong percussion-like noise, which often is felt as most disturbing.

In another prior-art and much improved driver means that eliminates entirely the need for interacting locking means acting between carriage and screw supports, the screw and the screw support are fitted with interacting driver means which, upon rotation of the screw in one direction, carry with them the screw support, displacing it from one of its stop end position to the opposite one and reversely, and which means slide on top of the screw in the end stop positions of the screw support until the screw changes its direction of rotation.

Irrespective of the length of the linear unit and the type of the driver means therein, the screw ends are mounted to ensure that they are centered in their associated bearings. Because of such factors as inevitable manufacturing and matching tolerances and wear on the one hand between screw and screw support and on the other between screw support and profiled rail, play and misalignment of the screw supports relative to the screw and the profiled rail often arise, particularly when the linear unit has been in use for some time. In turn, this leads to the screw supports being exposed to uneven loads from the screw during their movement backwards and forwards along the profiled rail, usually because the screw, when rotating, constantly or alternately exerts pressure on one or the other of the sides of the through-bore formed in the screw support, with consequential increase of wear and noise and in the end functional disturbances and even breakdown.

OBJECT OF THE INVENTION

The principal object of the present invention is to eliminate the disadvantages outlined above and to propose a device which, independently of tolerances, play and misalignment of the screw supports relative to the screw and the profiled rail, ensures that at all times the screw extends as straight as possible from one of its end bearings to the opposite one without exerting uneven load on the screw supports.

Another object of the invention is to propose a device of the kind defined above which efficiently counteracts and consequently reduces the tendency of the rotating screw to bend or be deflected outwards as it reaches a critical rotational speed.

Yet another object of the invention is to propose a device that is extremely simple and reliable as to its structure and function.

A further object of the invention is to propose a device possessing extremely high sliding and wear-resistance properties.

It is likewise an object of the invention to propose a device that operates extremely silently.

SUMMARY OF THE INVENTION

These and other objects of the invention are achieved in a manner that is as ingenious as it is unique by means of a self-centering element located in the through-bore of the screw support, which element has sliding contact with the screw both when the screw is rotating in one or the other of its directions and when the screw supports assume their end stop positions, in order to self-center the screw in the screw support.

BRIEF DESCRIPTION OF THE DRAWINGS

The invention will be described in more detail in the following with reference to the accompanying drawings, wherein

FIG. 6 is a view as seen from the side and above and shows a plate incorporated in the self-centering element of the first preferred embodiment.

FIG. 7 is a cross-sectional view corresponding to FIG. 4 and shows a second preferred embodiment of a self-centering element in the form of a sleeve.

FIG. 8 is a cross-sectional view along line VIII—VIII of FIG. 7, and

FIGS. 9A, 9B, and 9C are views as seen from the side, from above and from the end, respectively, of a driver means in the form of a pull rod incorporated in the linear unit of FIGS. 1–3.

DETAILED DESCRIPTION OF PREFERRED EMBODIMENTS

Figure 1:
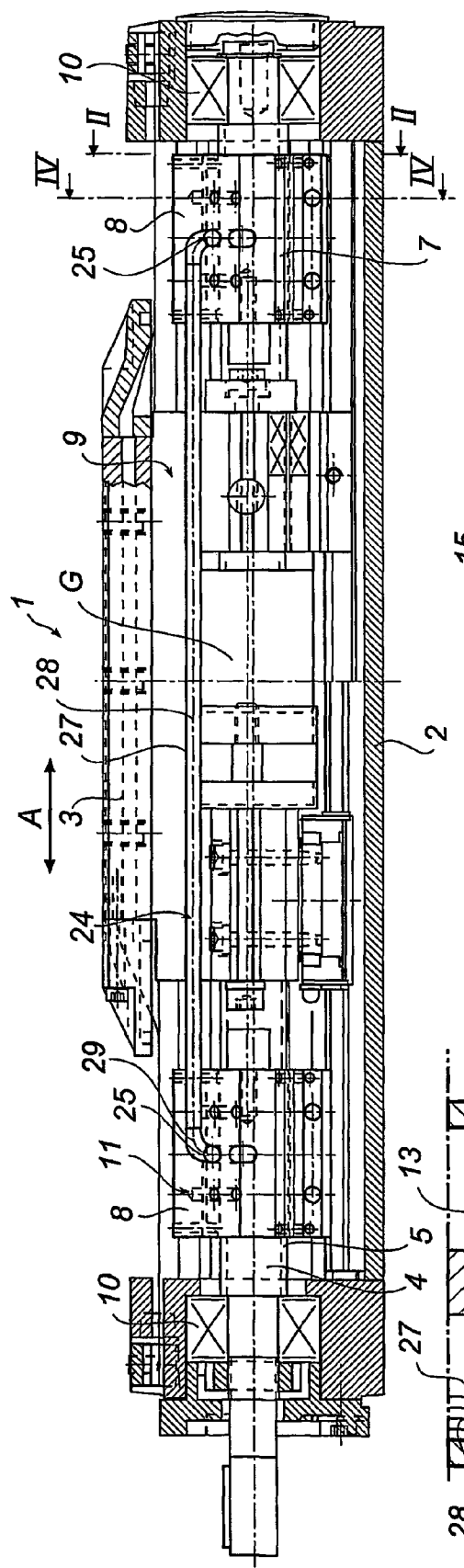
FIG. 1 is a longitudinal sectional view through a linear unit in accordance with a preferred embodiment of the invention comprising two screw supports.
Figure 2:
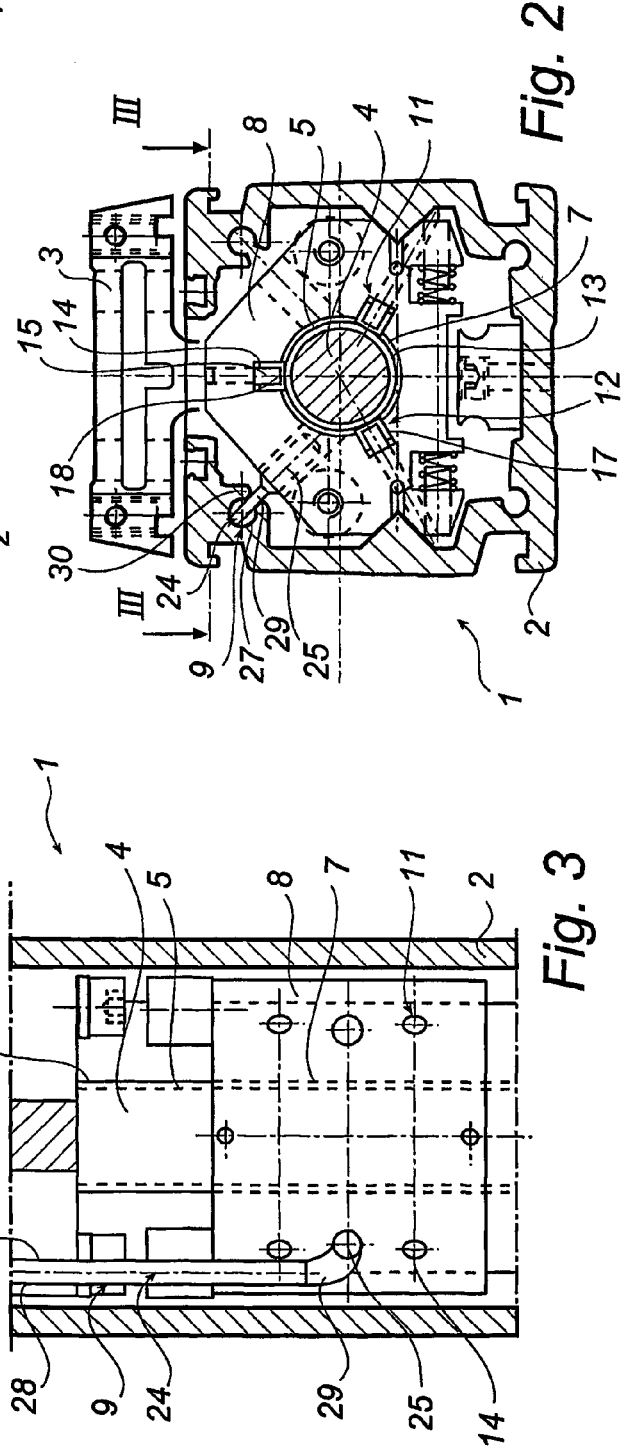
FIG. 2 is a cross-sectional view through the linear unit, the section being taken along line II—II of FIG. 1.
Figure 3:
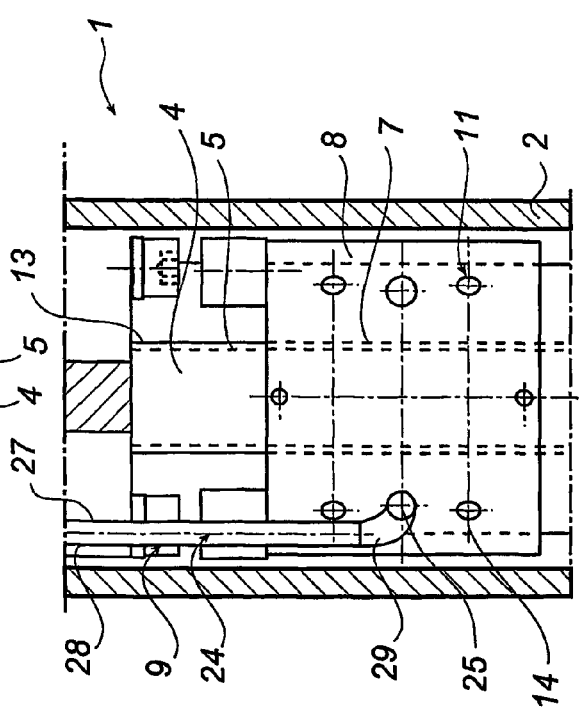
FIG. 3 is a longitudinal sectional view through a part of the linear unit, the section being taken along line III—III of FIG. 2.
Figure 4:
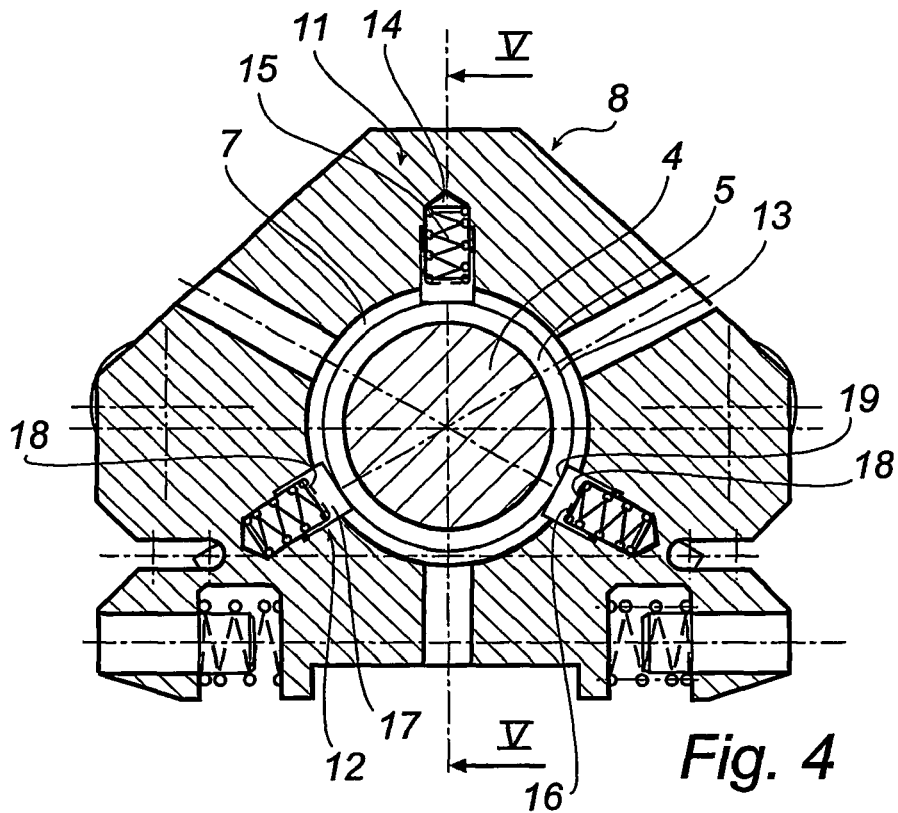
FIG. 4 is a cross-sectional view through one of the screw supports along line IV—IV of FIG. 1, having a self-centering element in accordance with a first preferred embodiment.

FIG. 1 shows in a longitudinal sectional view a linear unit, generally designated by numeral reference 1, said linear unit primarily intended for handling material within many diverse fields of industry where rapid and reliable handling of loads over large distances is required.

The principal components of the chosen linear unit 1 shown in the drawing figures are a profiled rail 2, preferably an extruded self-supporting aluminium profiled section, and a carriage 3, the latter being composed of a number of detail components preferably made from aluminium and/or steel.

The carriage 3 is supported and guided in and on the profiled rail 2 in such a manner as to be slidingly displaceable in a backwards and forwards movement in the longitudinal direction of the rail, as shown by the double arrow A. In turn, the carriage 3 is directly or indirectly connected to the load that is to be handled.

The sliding motion backwards and forwards of the carriage 3 is effected when the latter is actuated by a threaded screw 4, which may be rotated in both directions by a drive motor, not shown, and which is made from steel or some other suitable material, and which preferably is configured as a high-efficiency ball screw. The ball screw 4 is formed with threads 5 and in the conventional manner it is is drivingly connected with the carriage 3 via a ball nut 6.

Usually, e.g. depending on its length, the screw 4 extends freely through a through-bore 7 formed in one, as shown in FIG. 1, or two screw supports 8 located one on either side of the carriage 3. For e.g. weight considerations, the screw supports 8 suitably are made from a light-weight material, preferably from extruded aluminium, plastics or the like.

A driver means, designated by reference 9 and to be described in more detail in the following, in turn displaces the screw supports 8 backwards and forwards along the profiled rail 2 between end stop positions spaced along the screw 4, and as mentioned earlier, the screw supports serve to form bearings supporting the screw 4 intermediate end bearings 10 supporting the screw at the free ends of the latter.

In order to self-center the screw 4 in each individual screw support 8 when the screw is rotating and when the screw supports assume their respective end stop positions, a self-centering element, generally designated by 11, is located in the through-bore 7 of each screw support. Each self-centering element 11 suitably is configured as at least one slide member 12 arranged to slide across the outer peripheral surface 13 of the screw 4. More precisely, the slide member or each slide member 12 extends essentially in the longitudinal direction of the screw 4 and is biased in a resilient manner and in an essentially radial direction towards the screw into sliding abutment against the outer peripheral surface 13 of the screw 4. The resilient bias preferably is effected by means of springs 15 mounted in holes 14 formed in each screw support 7, said springs 15 exerting pressure on the external or rear face 16 of each slide member 12.

As to the slide members 12, each such member may be designed in many various ways, and FIGS. 1–6 and FIGS. 7 and 8 show respectively a first a and second presently preferred embodiment.

Figure 5:
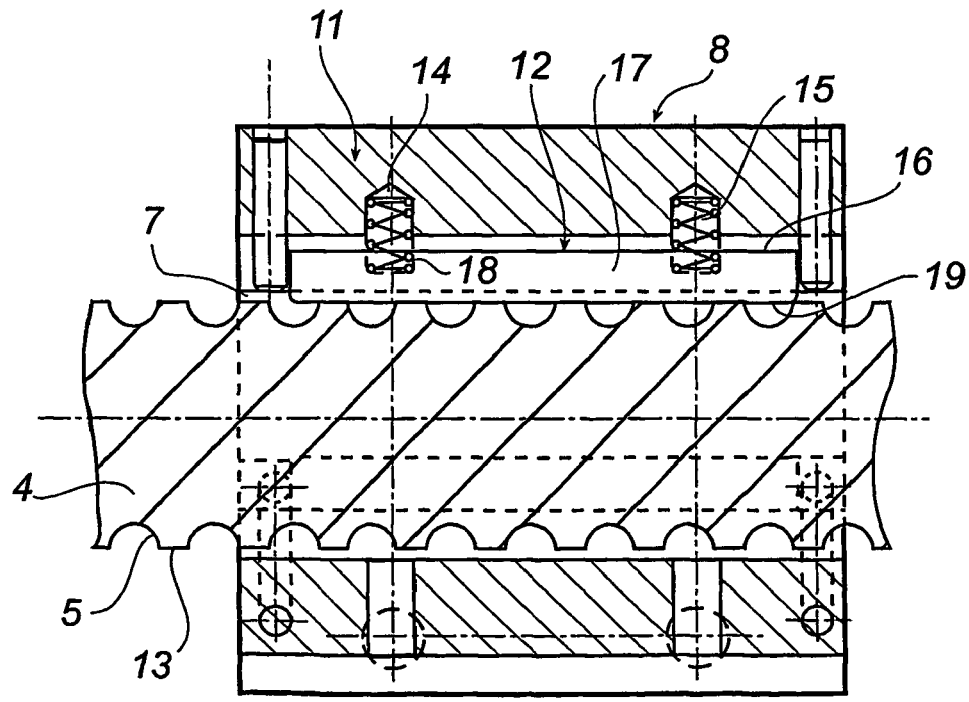
FIG. 5 is a longitudinal sectional view along line V—V of FIG. 4.
Figure 9B:
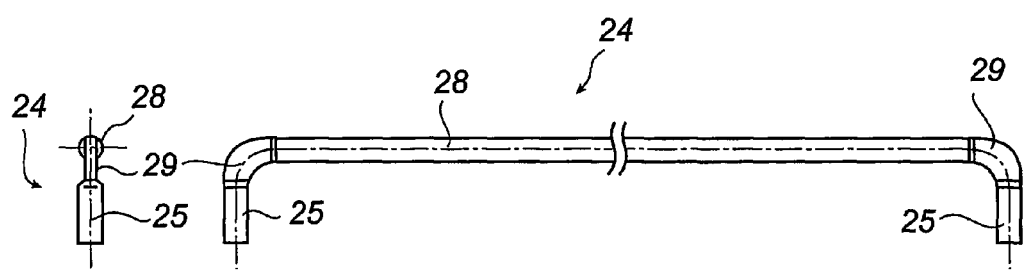
Figure 9B:
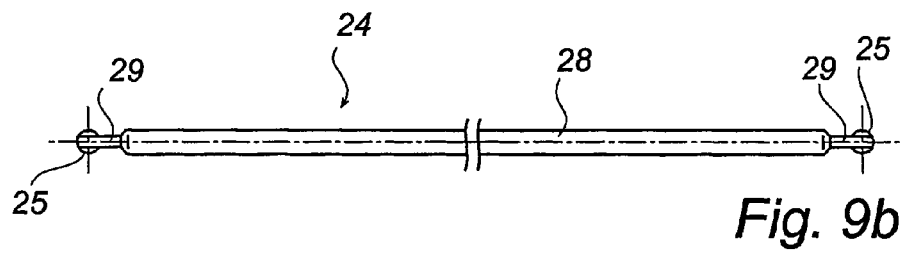

The slide member 12 shown in FIGS. 1–6 is designed as an elongate plate 17 extending essentially in the lengthwise direction of the screw 4, see FIG. 5. The plate 17 is biased by two helical compression springs 15, which are placed in spaced-apart locations in the longitudinal direction of the screw, as is also apparent from FIG. 5. Preferably, the plate 17 is manufactured from a comparatively hard material, such as a hard plastics material possessing extremely good sliding and wear-resistant properties. For reception of the helical compression springs 15, the plate 17 is likewise formed with blind holes 18, and on its inner side or front facing the screw 4 the plate 17 is essentially smooth to enhance its sliding and self-centering abutment against the outer periphery 13 of the screw 4.

In order to ensure optimally even and efficient self-centering effect when the screw 4 rotates in either one of the rotational directions thereof and when the screw supports 8 assume one of their end stop positions, the slide members 12, designed as plates 17, preferably are spaced as evenly as possible around the screw 4. In the shown embodiment, three such plates 17 are spaced evenly around the screw. Alternatively, these plates could be arranged in one or several groups about the screw, an alternative that is not, however, shown herein. The number of groups and of plates included in each group may be varied according to wish, for example depending on the size of the plates 17 relative to the associated screw support 8, the size of the screw support itself, the diameter of the screw and so on.

In the embodiment of the slide member 12 shown in FIGS. 7 and 8, said member is designed as a sleeve 20 extending in the longitudinal direction of the screw and in the shown embodiment it encloses the screw 4 entirely and is disposed in the interstice or gap between the through-bore 7 of the associated screw support 8 and the outer periphery 13 of the screw 4. Like the plate/plates 17 in the previous embodiment, the sleeves 20 are resiliently and essentially radially biased towards the screw 4. Suitably, this effect is obtained by means of helical compression springs 21 that correspond to the helical compression springs 15 and are spaced apart from one another in the longitudinal direction of the screw and also spaced evenly about the screw 4, as appears from FIGS. 7 and 8. Like the plate/plates 17, the sleeve 20 preferably is manufactured from a comparatively hard material, such as hard plastics, possessing extremely high sliding and wear-resistance properties. The helical compression springs 21 abut against the external face 22 of the sleeve 20, and like the inner face of the plate/plates 17, the inner face 23 of each spring facing the screw 4 is essentially smooth to enhance the sliding and self-centering abutment of the sleeve against the outer periphery 13 of the screw 4.

The sleeve 20 may be designed otherwise than as one integral sleeve wholly enclosing the screw. For example, it could be composed of several annular components positioned concentrically in succession in the longitudinal direction of the screw, each one of them being biased in the manner indicated above. Another alternative is to slit the sleeve in the longitudinal direction of the sleeve and of the screw or to construct the sleeve from elongate arc segments arranged in abutting relationship along their long edges or with clearances between the segments in the circumferential direction. Additional alternatives exist; the choice depends on the size of the sleeve 20 relative to the associated screw support 8, the size of the screw support itself, the diameter of the screw and so on, as mentioned previously.

The previously mentioned driver means generally designated by reference 9, serving to displace the screw supports 8 between the end stop positions of the latter, is shown in FIGS. 1–3 and 9A, B, and C. The driver means 9 kinetically interconnects the two screw supports 8 on either side of the carriage 3. More precisely, the interconnection is such that when the carriage, while being displaced in a sliding motion in one direction by means of the ball screw 6, abuts against one of the screw supports 8 located on one side of the carriage 3 and displaces that screw support from one to the other of the end stop positions of the latter, it will also, via the driver means 9 bring along in its motion the other screw support 8 located on the opposite side of the carriage 3. As the carriage is displaced in a sliding motion in the opposite direction, the procedure as described above is repeated but in the reverse order.

Thus the driver means 9 is fixedly connected with the screw supports 8 and extends freely past the carriage 3.

In accordance with the preferred embodiment illustrated in FIGS. 1–3 and FIGS. 9A, B, and C, the driver means 9 preferably is designed as a pull rod 24 suitably made from extruded aluminium or steel. At its free ends 25 the pull rod 24 is attached in any known manner to the associated screw support 8, its ends being guided in the profiled rail 2 of the linear unit 1 beyond and spaced from the carriage 3. More precisely, the pull rod 24 is guided with a suitable sliding fit in an elongate guide means 27 formed in the profiled rail 2. An elongate guide portion 28 of the pull rod 24, located inside the guide means, and the guide means 27 itself are configured with essentially complementary profile shapes, preferably a circular shape.

In the shown embodiment, the free attachment ends 25 of the pull rod 24 form an angle, e.g. of essentially 90°, to the guide portion 28 of said rod. Intermediate each attachment end 25 and the guide portion 28, the pull rod is formed with a transitional portion 29 passing through an elongate recess 30 that is formed in the guide means 27 and that is open towards the screw supports 8, see FIG. 2. To ensure that the guiding function of the pull-rod guide portion 28 in the guide means 27 is not jeopardised, the transitional portion 29 and the recess 30 are given less substantial, that is smaller dimensions than the guide portion 28 and the guide means 27.

In accordance with one embodiment, not shown, two or several screw supports 8, arranged in pairs, are provided on either side of the carriage 3. In this case, the screw supports of the first pair closest to the carriage on either side thereof are kinetically interconnected by means of a first pull rod corresponding to pull rod 24, and the screw supports of the pair or other pairs, located beyond the nearest pairs, are kinetically interconnected in pairs by means of one further pull rod each, corresponding to pull rod 24 but longer than the latter. Owing to this construction, displacement of one of the screw supports of the first pair in response to actuation thereon by the carriage 3, as the latter is sliding in one direction along the screw 4, will result in abutment of that screw support against the closest screw support of the next pair for displacement of said support, and so on, depending on the number of screw-support pairs, and reversely as the carriage 3 is displaced in a sliding motion in the opposite direction.

As will be appreciated, the invention should not be regarded as restricted to the embodiments shown and described herein but could be modified in various ways within the scope of the protection defined in the appended claims.

The invention claimed is:

1. A device for linear drive units comprising:
   a profiled rail along which a carriage is arranged for sliding movement backwards and forwards in response to actuation from a threaded screw, said screw arranged to rotate in opposite directions and being drivingly connected with the carriage and, on either side of the carriage, passing through a through-bore in at least two screw supports,
   said screw supports being arranged to be displaced by a driver means for movement backwards and forwards along the profiled rail between two end stop positions and forming bearing means carrying said screw intermediate at least two end bearings that support the screw at the ends of the said screw,
   wherein the driver means kinetically interconnects the screw supports located on either side of the carriage, and
   wherein the carriage, when being slidingly displaced in one direction, abuts against the screw support on one side of the carriage for displacement of that screw support from one of the end stop positions, said carriage simultaneously, by means of the driver means bringing, along in its movement of the screw support located on the other side of the carriage, and reversely.

2. The device as claimed in claim 1, wherein the driver means is fixedly attached to the screw supports and extends freely past the carriage.

3. The device as claimed in claim 1, wherein the driver means is a pull rod having free ends of which are attached to the associated screw support and which pull rod intermediate its attachment ends are guided in the profiled rail of the linear unit beyond and spaced from the carriage.

4. The device as claimed in claim 3, wherein the pull rod is fitted into an elongate guide means in the profiled rail of the linear unit to be guided therein, a guide portion of the rod that is located in the guide means and the guide means being configured with essentially complementary profile shapes.

5. The device as claimed in claim 4, wherein the free attachment ends of the pull rod form an angle to the guide portion of the rod and wherein intermediate each one of its attachment ends and the guide portion, said pull rod is formed with a transitional portion passing through an elongate recess that is formed in the guide means and is open towards the screw supports.

6. The device as claimed in claim 5, wherein said transitional portion and the recess have smaller dimensions than the guide portion and the guide means.

7. The device as claimed in claim 1, wherein there are at least two screw supports pairs arranged in pairs on either side of the carriage, and wherein the screw supports of a first pair closest to the carriage on either side thereof are kinetically interconnected by means of a first pull rod and a screw support of at least one second pairs located beyond the first at least one pairs, are kinetically interconnected in pairs by means of one further pull rod each, whereby displacement of one of the screw supports of the first pair in response to actuation thereon by the carriage, will result in abutment of that screw support against the closest screw support of said second pair for displacement of both of said supports and their respective pair, and reversely as the carriage is displaced in a sliding motion in the opposite direction.

8. The device as claimed in claim 1, wherein a self-centering element located in the through-bore of the screw support is provided, which element has sliding abutment contact with the screw both when the screw is rotating in one or the other of its directions and when the screw supports assume their end stop positions, in order to self-center the screw in the screw support.

9. The device as claimed in claim 8, wherein the self-centering element is configured as a slide member that slides on top of the outer periphery of the screw.

10. The device as claimed in claim 9, wherein the slide member is formed by a plate, which extends essentially in the lengthwise direction of the screw and which is resiliently biased in an essentially radial direction towards the screw.

11. The device as claimed in claim 8, wherein several slide members are provided, said members being evenly spaced and/or arranged in one or several groups around the screw.

12. The device as claimed in claim 9, wherein the slide member is formed by a sleeve, said sleeve extending in the longitudinal direction of the screw and enclosing said screw and being resiliently biased in an essentially radial direction towards the screw.

13. The device as claimed in claim 12, wherein the sleeve is positioned in a gap between the through-bore of the screw support and the outer periphery of the screw.

14. The device as claimed in claim 13, wherein at its inner face, the sleeve slidingly abuts against the outer periphery of the screw whereas at its outer face said screw is resiliently biased in an essentially radial direction towards the screw by means of at least one spring means directed in an essentially radial direction towards the screw.

15. A device for linear-drive units comprising:
   a profiled rail along which a carriage is arranged for sliding movement backwards and forwards in response to actuation from a threaded screw, said screw arranged to rotate in opposite directions and being drivingly connected with the carriage and, on the other side of the carriage, passing through
   a through-bore, in at least two screw supports, said screw supports being arranged to be displaced by a pull rod for movement backwards and forwards along the profiled rail between two end stop positions and forming bearing means carrying said screw intermediate at least two end bearings that support the screw at the ends of the said screw,
   wherein the pull rod kinetically interconnects the screw supports located on either side of the carriage and wherein the carriage, when being slidingly displaced in one direction, will abut against the screw supports on one side of the carriage for displacement of that screw support from one of the end stop positions of the said screw to the other end stop position, said carriage simultaneously by the pull rod brings along its movement of the screw support located on the other side of the carriage, and reversely.

16. The device as claimed in claim 15, wherein the pull rod is fixedly attached to the screw supports and extends freely past the carriage.

17. The device as claimed in claim 15, wherein the pull rod has free ends which are attached to the associated screw supports and the free ends are guided in the profiled rail spaced from the carriage.

* * * * *